US012664293B2

(12) United States Patent
Earll et al.

(10) Patent No.: US 12,664,293 B2
(45) Date of Patent: Jun. 23, 2026

(54) SYSTEM AND METHOD FOR COMMENT PERMISSIONS

(71) Applicant: WORKIVA INC., Ames, IA (US)

(72) Inventors: Mallory Kay Earll, Chicago, IL (US); Piper Caroline Galyean, Wakefield, MA (US); Spencer Patrick Bradley, Ames, IA (US); David Edward Marne, Seattle, WA (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 18/386,362

(22) Filed: Nov. 2, 2023

(65) Prior Publication Data

US 2025/0148105 A1     May 8, 2025

(51) Int. Cl.
*G06F 21/62* (2013.01)
*G06F 40/169* (2020.01)

(52) U.S. Cl.
CPC ........ *G06F 21/6209* (2013.01); *G06F 40/169* (2020.01); *G06F 2221/2141* (2013.01)

(58) Field of Classification Search
CPC .............. G06F 21/6209; G06F 40/169; G06F 2221/2141
See application file for complete search history.

(56) References Cited

U.S. PATENT DOCUMENTS 10,410,016 B1 * 9/2019 Damick .............. G06F 21/6209
2008/0147841 A1 * 6/2008 Nishino .............. H04L 67/1095
707/E17.107

2009/0125597 A1 * 5/2009 Carr ...................... H04L 51/234
709/206
2009/0150761 A1 * 6/2009 Sawicki .............. G06F 21/6218
715/216
2009/0327855 A1 * 12/2009 Le ........................ G06F 16/9558
715/230
2011/0054968 A1 * 3/2011 Galaviz .............. G06Q 10/0635
705/7.41
2013/0297691 A1 * 11/2013 Collins .................. G06Q 50/01
709/204
2014/0013104 A1 * 1/2014 Vinnik .................. H04L 63/123
713/150
2015/0052427 A1 * 2/2015 Vagell ................... G06F 16/176
715/256
2015/0370769 A1 * 12/2015 Pereira Filho ........ G06F 40/166
726/28
2017/0012993 A1 * 1/2017 Lieu ...................... G06F 40/117
2017/0168856 A1 * 6/2017 Bhargava ............... G06F 9/453

(Continued)

*Primary Examiner* — Vance M Little
(74) *Attorney, Agent, or Firm* — Faegre Drinker Biddle & Reath LLP

(57) ABSTRACT

A method for restricting comment access for a document is described. A request for comment permissions to be applied to a comment within the document is received. The comment permissions exclude a target user from an access type for the comment. The comment permissions are applied to the comment, where the comment permissions are distinct from document permissions for the document. Content data of the document is generated for display on a user interface for the target user according to the document permissions. Content data of the comment is generated for display on the user interface for the target user according to the comment permissions, including restricting the target user from the access type for the comment.

21 Claims, 9 Drawing Sheets

(56) References Cited

U.S. PATENT DOCUMENTS

| | | | | |
|---|---|---|---|---|
| 2017/0206366 A1* | 7/2017 | Fay | ....................... | G06F 40/106 |
| 2019/0179876 A1* | 6/2019 | Zhang | ................. | G06F 16/1873 |
| 2020/0210693 A1* | 7/2020 | Scanlan | .............. | G06Q 10/101 |
| 2022/0201049 A1* | 6/2022 | Jamison | ................ | H04L 65/403 |
| 2022/0222625 A1* | 7/2022 | Haramati | ............. | G06F 3/0484 |
| 2023/0289411 A1* | 9/2023 | Sinha | .................... | G06F 21/335 |

* cited by examiner

*FIG. 1*

<u>Comment Summary</u>

20 total comments in
 3 comment threads
    1 open thread (Author: Vernon; Last reply: Carrie)
    1 resolved thread (Author: Carrie: Last reply: Dave)
    1 hidden thread (15 hidden comments)

Figure 8:
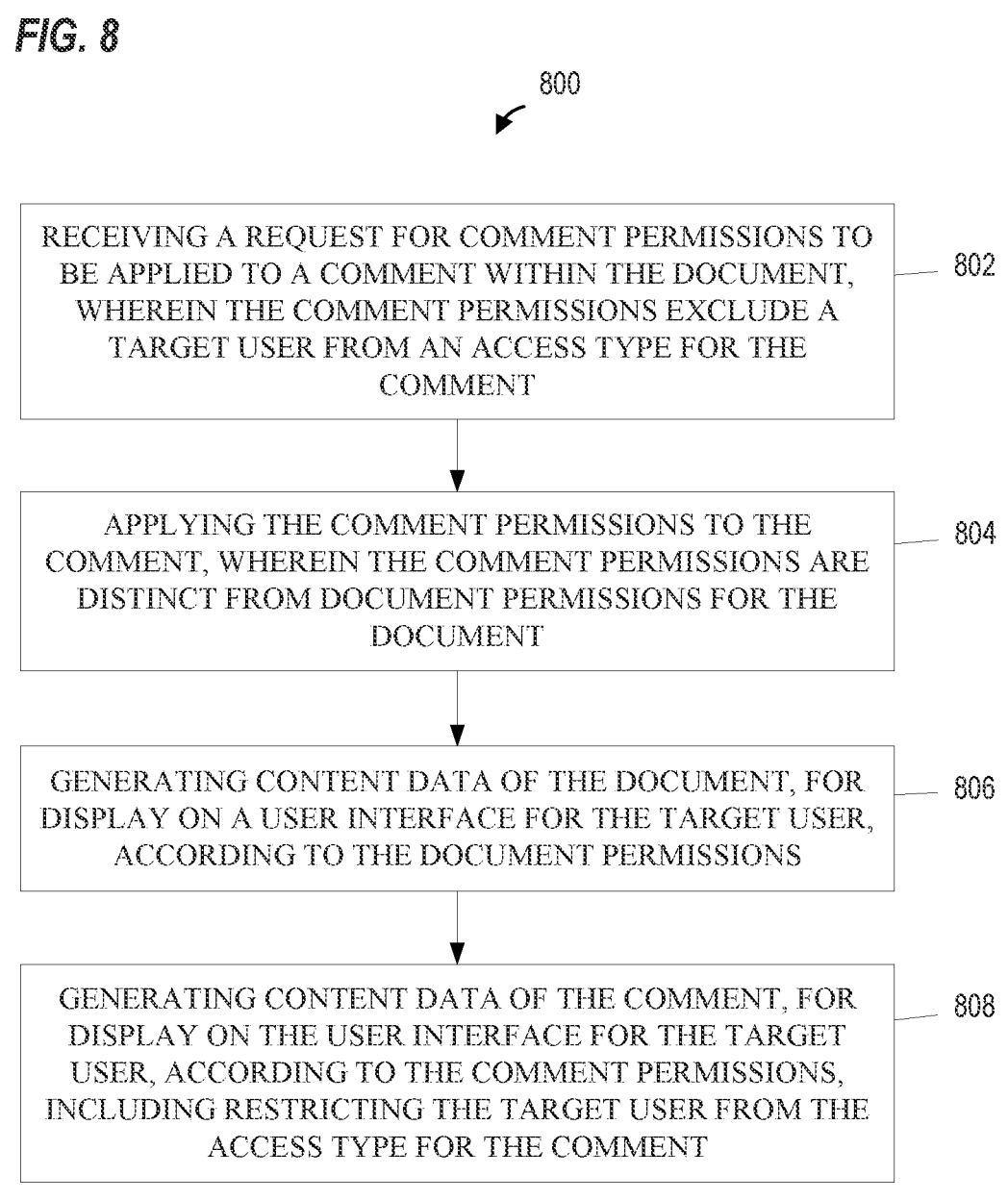

RECEIVING A REQUEST FOR COMMENT PERMISSIONS TO BE APPLIED TO A COMMENT WITHIN THE DOCUMENT, WHEREIN THE COMMENT PERMISSIONS EXCLUDE A TARGET USER FROM AN ACCESS TYPE FOR THE COMMENT — 802

APPLYING THE COMMENT PERMISSIONS TO THE COMMENT, WHEREIN THE COMMENT PERMISSIONS ARE DISTINCT FROM DOCUMENT PERMISSIONS FOR THE DOCUMENT — 804

GENERATING CONTENT DATA OF THE DOCUMENT, FOR DISPLAY ON A USER INTERFACE FOR THE TARGET USER, ACCORDING TO THE DOCUMENT PERMISSIONS — 806

GENERATING CONTENT DATA OF THE COMMENT, FOR DISPLAY ON THE USER INTERFACE FOR THE TARGET USER, ACCORDING TO THE COMMENT PERMISSIONS, INCLUDING RESTRICTING THE TARGET USER FROM THE ACCESS TYPE FOR THE COMMENT — 808

Figure 9:
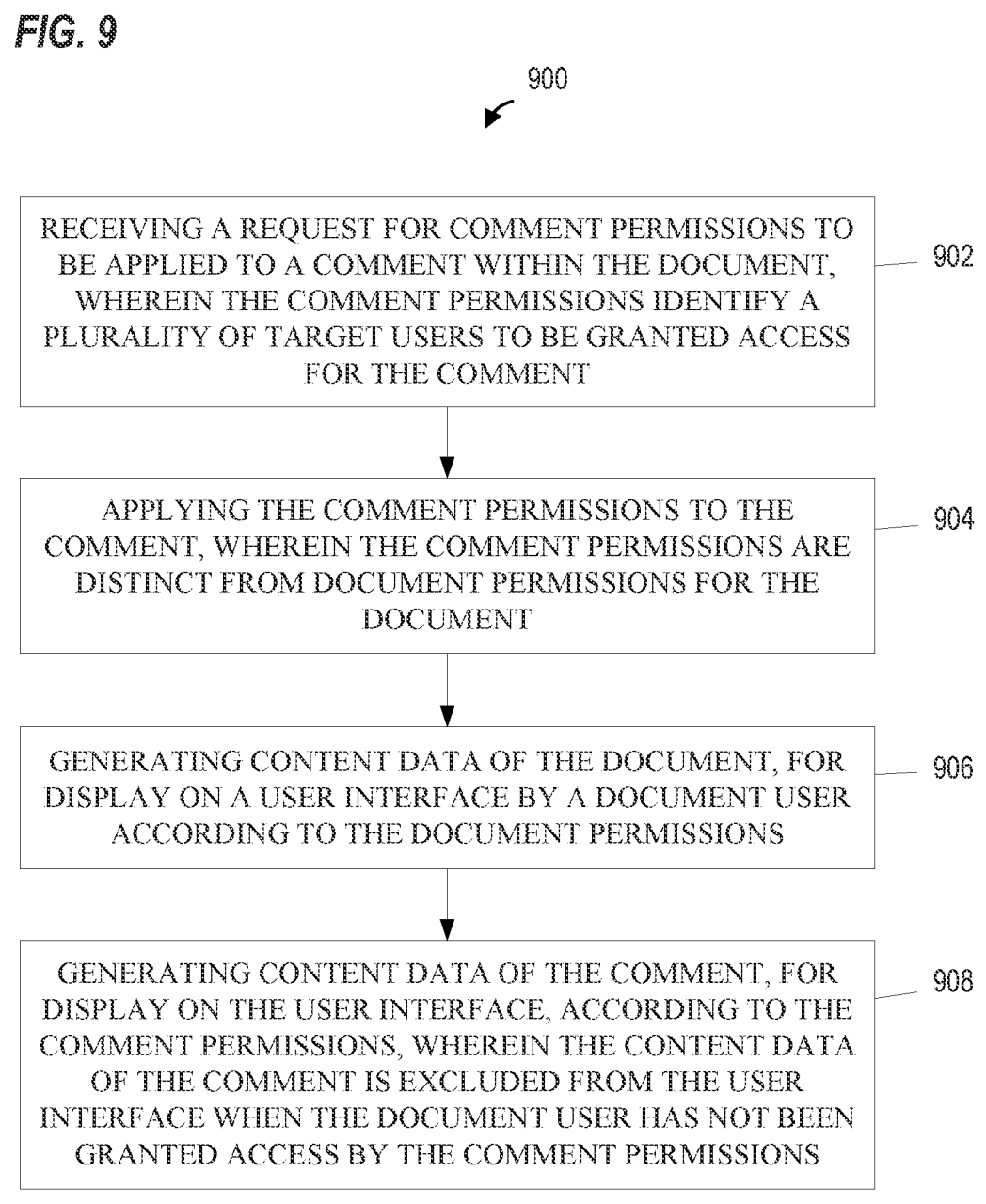

RECEIVING A REQUEST FOR COMMENT PERMISSIONS TO BE APPLIED TO A COMMENT WITHIN THE DOCUMENT, WHEREIN THE COMMENT PERMISSIONS IDENTIFY A PLURALITY OF TARGET USERS TO BE GRANTED ACCESS FOR THE COMMENT — 902

APPLYING THE COMMENT PERMISSIONS TO THE COMMENT, WHEREIN THE COMMENT PERMISSIONS ARE DISTINCT FROM DOCUMENT PERMISSIONS FOR THE DOCUMENT — 904

GENERATING CONTENT DATA OF THE DOCUMENT, FOR DISPLAY ON A USER INTERFACE BY A DOCUMENT USER ACCORDING TO THE DOCUMENT PERMISSIONS — 906

GENERATING CONTENT DATA OF THE COMMENT, FOR DISPLAY ON THE USER INTERFACE, ACCORDING TO THE COMMENT PERMISSIONS, WHEREIN THE CONTENT DATA OF THE COMMENT IS EXCLUDED FROM THE USER INTERFACE WHEN THE DOCUMENT USER HAS NOT BEEN GRANTED ACCESS BY THE COMMENT PERMISSIONS — 908

SYSTEM AND METHOD FOR COMMENT PERMISSIONS

TECHNICAL FIELD

The present disclosure relates generally to electronic document management and, more particularly, to a system and method for managing comments in electronic documents.

BACKGROUND

In systems configured to maintain electronic documents, particularly those with many different users reviewing and requesting changes, comments provided by reviewers can be important yet time-consuming to track and manage. In some scenarios, it may be desirable to limit access to certain comments, for example, to provide an independent review of a document, to provide anonymity to the reviewer and thereby promote candid feedback, or to improve readability of the document to users not affected by certain comments.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 1 is an example of a networking environment in which various embodiments of the disclosure may be implemented, according to an embodiment;

FIG. 7 is a block diagram of an example user interface for displaying a comment summary, according to an embodiment;

FIG. 8 is a flowchart illustrating an example method, implemented on a server, for restricting comment access for a document, according to an embodiment;

FIG. 9 is a flowchart illustrating another example method, implemented on a server, for restricting comment access for a document, according to an embodiment.

DETAILED DESCRIPTION

Figure 2:
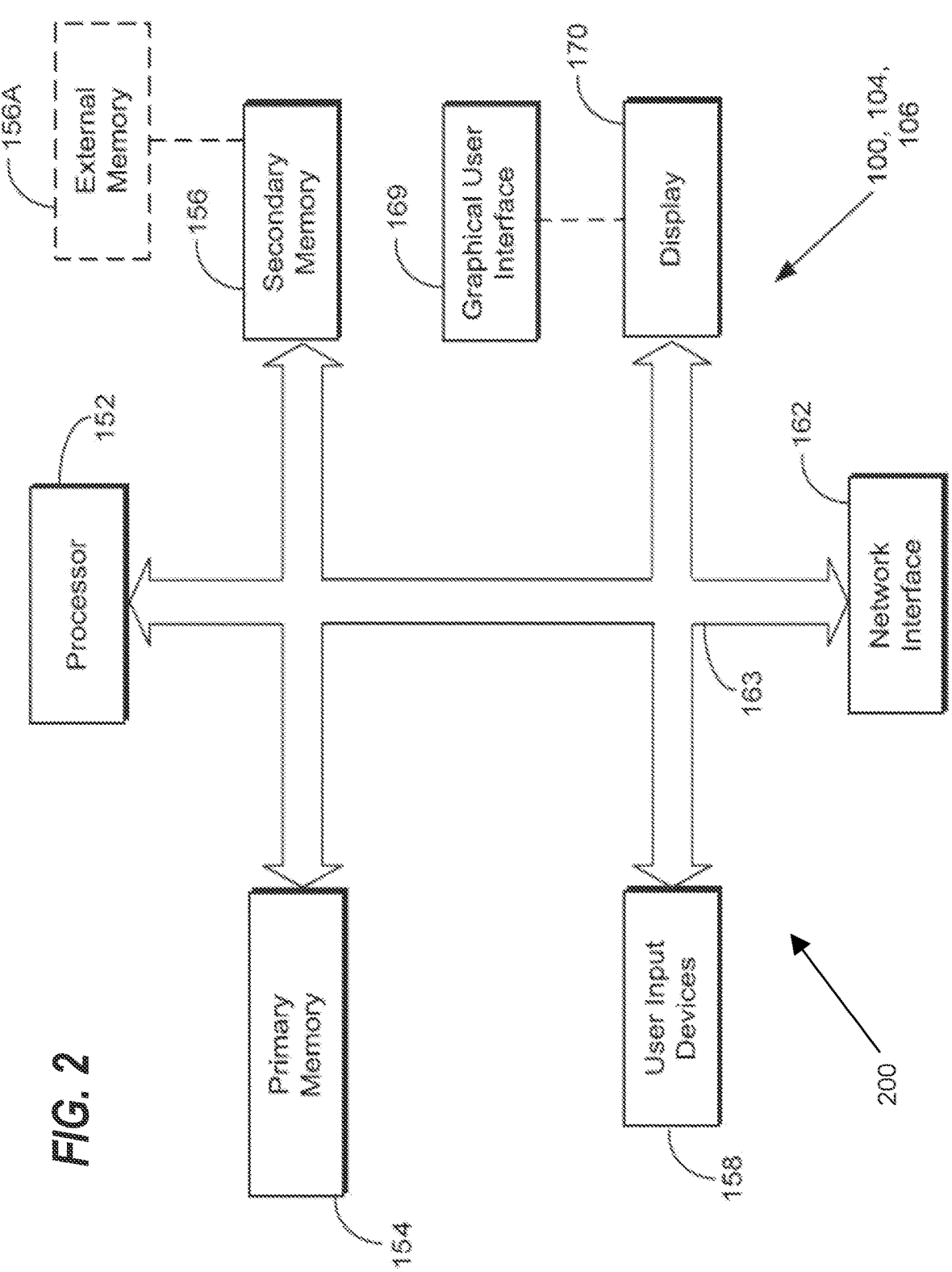
FIG. 2 is a block diagram of a computing device, according to an embodiment.

Systems that allow for document collaboration among many users may provide more efficient document generation, review; and revisions. However, some reviews of a document may result in questions instead of clear revisions. In some scenarios, comments may be inserted into, or associated with, a document and provide a separate location for substantive content, informal discussion, questions about the document, etc. Some comments may not be relevant to other users. For example, comments about technical content within the document from users within a software development group may not be relevant, or may even be confusing, to users within a finance group. Additionally, some comments may be preferred to be private or anonymous (e.g., to appear anonymous to another user or group of users by hiding an author's identity). For example, a group of reviewers may provide more detailed or candid feedback about a document if they know that their individual comments cannot be readily traced back to them by a recipient of the comments.

Disclosed herein is a system for providing comment permissions for a plurality of documents. Various embodiments of the disclosure are implemented in a computer networking environment. The system is configured to receive a request for comment permissions to be applied to a comment within a document. The comment permissions may be selected using an "excludes" model, for example, to exclude a target user, or a group of target users, from an access type for the comment. Alternatively, the comment permissions may be selected using an "includes" model, for example, by selecting individual users or groups that are to be granted access to a comment and restricting access to those users that have not been granted access. In either case, the comment permissions effectively exclude at least some users from access, either explicitly (excludes model) or implicitly (includes model). Different access types may be allowed, for example, to allow or deny view access to a comment (e.g., hidden from view), allow or deny read access to the comment (e.g., a user sees that the comment exists, but not the content of the content), allow or deny write access (e.g., user can write a reply), or other suitable access types. Notably, the comment permissions may be different from document permissions for the document (e.g., permissions related to content within the document or access to the document itself). In some scenarios, for example, a user may have write access to create comments (e.g., with comments stored and maintained separately from the document), but read-only access to the document itself. In some scenarios, the comment permissions are a subset of the document permissions. The system generates content data of the document, for display on a user interface for the target user, according to the document permissions. For example, the content data may instruct a user interface application to render the content of the document. The system also applies the comment permissions to the comment and generates content data of the comment, for display on the user interface for the target user, according to the comment permissions, including restricting the target user from the access type for the comment. For example, the comment data may instruct the user interface application to render the appropriate comments (i.e., only those comments with appropriate permissions).

Figure 1:
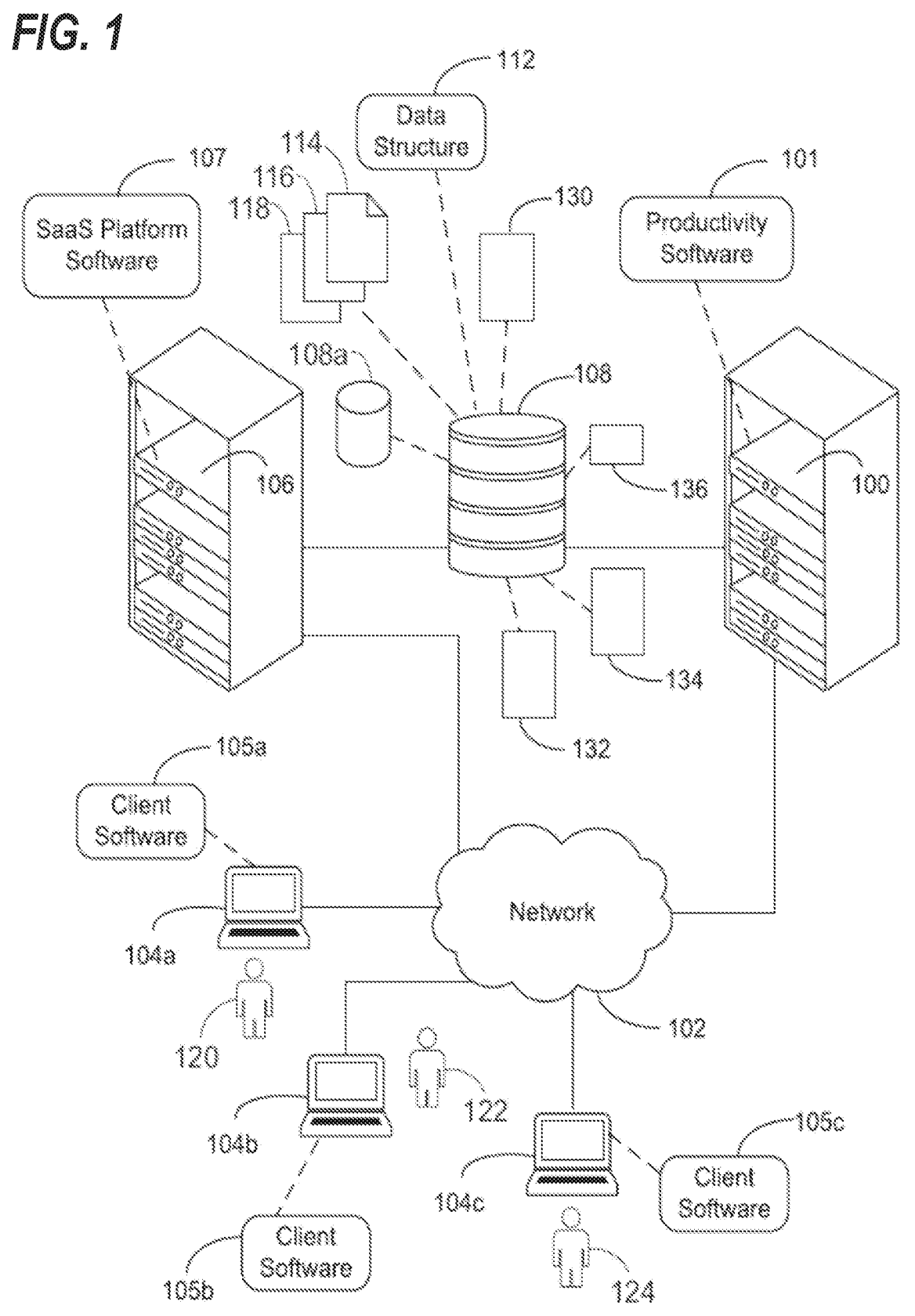

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104*a*, a second user 122 operates the third computing device 104*b*, and a third user 124 operates the fourth computing device 104*c*. Each of the computing devices 104*a*, 104*b*, and 104*c* executes client software (reference numerals 105*a*, 105*b*, and 105*c*, respectively). One possible implementation of the client software is a web browser.

Residing within the media storage device 108 is a database 108*a* containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104*a*, 104*b*, and 104*c* are depicted as notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

In various embodiments, at least some documents are stored using a suitable data structure configured to maintain links and references between cells, tables, paragraphs, sections, or other suitable portions of a document. In an embodiment, documents are stored using an RTree data structure. In another embodiment, documents are stored using a causal tree data structure.

In an embodiment, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction). CauseID (ID of the parent instruction), and Value (value of the instruction). Observations have a 3-tuple: ID (ID of the instruction). Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108*a* and providing a programming platform for various processes launched by the productivity software (e.g., to manipulate, store, and retrieve documents and other information from the database 108*a*). Under the control of the productivity software 101, the productivity server 100 interacts with the database server 106 (which operates under the control of the SaaS platform software 107) and the computing devices 104*a*, 104*b*, and 104*c* (also referred to as "client devices") to allow the computing devices to access the first document 114, the second document 116, and the third document 118 so that the first user 120, the second user 122, and the third user 124 can collaborate in editing the documents (e.g., moving sections around in a particular document).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized.

FIG. 2 is a block diagram of a computing device 200, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both of the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 102. In an embodiment, this communication takes place via a user interface that the productivity server 150 provides to the computing devices 154a, 154b, and 154c. The specific nature of the user interface and what the user interface shows at any given time may vary depending on what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 3:
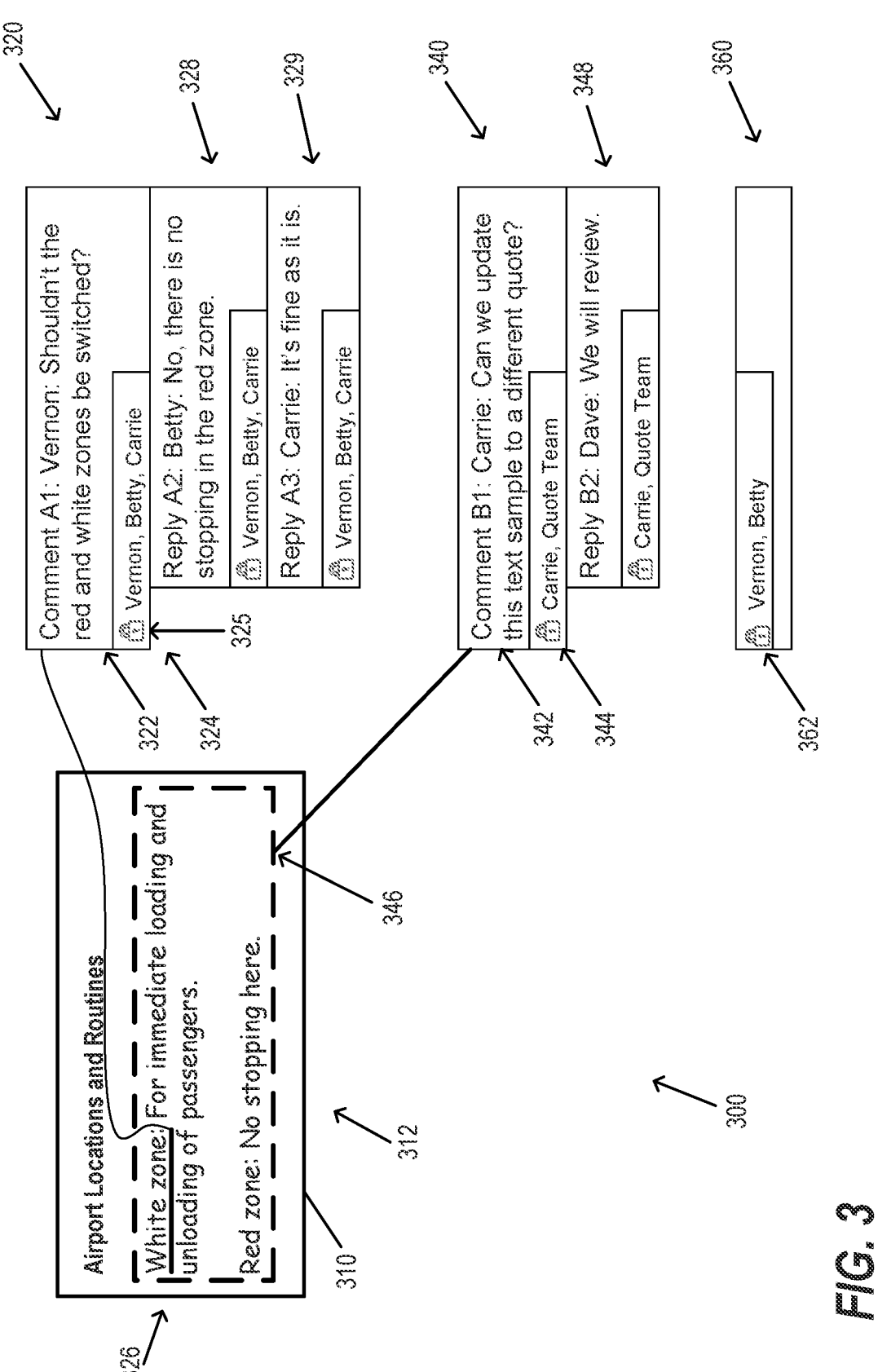
FIG. 3 is a diagram of an example user interface for displaying comments in an electronic document, according to an embodiment.

FIG. 3 is a diagram of an example user interface 300 for displaying comments in an electronic document, according to an embodiment. The user interface 300 may be provided by the computing device of FIG. 2, one or more of the computing devices 104, or other suitable devices, in various examples. In the embodiment shown in FIG. 3, the user interface 300 may correspond to the client software 105 and display a document 310 (or a portion thereof). The document 310 may be any suitable electronic document, for example, a spreadsheet document, text or text-based document (e.g., contract or legal document, source code, essay, HTML, script, etc.), presentation document, or other suitable document types. In the example shown in FIG. 3, the document 310 includes document content 312, including a title ("Airport Locations and Routines") and a description ("White zone: For immediate loading . . . ").

As described above, comments related to the content of a document (e.g., document content 312) may be created by a user, for example, during document generation, review, and/or finalization. In some examples, a single user may create comments for themselves as personal notes when drafting the document content. As such, the user may prefer that other users not be able to view their personal comments. In other examples, two or more users may collaborate to draft all or a portion of a document and may prefer that non-collaborators (e.g., customers or clients, users in a different work department, etc.) not be able to view their collaborator comments.

The user interface 300, as provided by a suitable computing device described above, is configured to provide functionality for comments and comment permissions, allowing a user to restrict target users from one or more access types. As described above, different access types may be allowed, for example, to allow or deny view access to a comment (e.g., hidden from view), allow or deny read access to the comment (e.g., a user sees that the comment exists, but not the content of the content), allow or deny write access (e.g., user can write a reply), or other suitable access types. Notably, the comment permissions may be different from document permissions for the document. In some scenarios, a user may have write access to create comments, but read-only access to the document itself. In the example shown in FIG. 3, the comments 320, 340, and 360 have different comment permissions (i.e., each comment has its own set of permissions). In other examples, all comments within a document (or document section) may have the same comment permissions (i.e., a document level or global level of permissions for comments). Moreover, those same comment permissions may be a subset of the document permissions for the document containing those comments. For example, a user may need write access to a document in order to add comments to the document.

In the example shown in FIG. 3, a comment 320, a comment 330, and a comment 340) are associated with the document 310. Generally, comments have content ("comment content") and an anchor. The content may be text, images, audio, video, or other suitable content that is communicated to a user. The anchor may be a reference, pointer, or other identifier that indicates a location within the document 310 at which the comment content is relevant. In various examples, the anchor may refer to all or a portion of document content, such as an entire document, a section within a document, a paragraph, sentence, word, letter, table, column or row of a table, cell within a table, etc. In some examples, the anchor refers to a node within a tree data structure (e.g., the RTree or causal tree described above) and thus refers to metadata within a document, but not the document content itself. In still other examples, the anchor may refer to a location within the user interface 300, such as X and Y coordinates (e.g., where [0,0] refers to a lower left corner, while [960,512] refers to an approximate middle of a 1920×1024 interface). In some examples, the anchor may be associated with a bounding box, underlining, font color, or other suitable visual identifier that may be displayed on the user interface 300 to improve visibility and identification of a relevant section of the document content pertaining to a particular comment. For example, a bounding box may surround document content associated with a comment, or underlining may be applied to a word associated with a comment.

The comment permissions may restrict target users from an access type, or allow permissioned users to utilize the access type (e.g., granting access to permissioned users), in various examples. The user interface 300 may be configured to indicate which permissioned users and/or permissioned user groups have access to a particular comment. In some scenarios, both individual users and permissioned groups are associated with a particular comment, referred to herein collectively as a comment group. For example, a user may create a comment intended to be viewed only by a particular group. In one such example, a software code reviewer creates a comment and applies comment permissions so that the software code reviewer and members of a software development group are able to view the comment.

In the example shown in FIG. 3, the comment 320 includes comment content 322, a comment group 324, and a permissions indicator 325. The comment content 322 includes text "Shouldn't the red and white zones be switched?" In some examples, the comment content 322 further includes, or alternatively is displayed with, additional data, such as a comment identifier (e.g., "Comment A1") that indicates a globally unique identifier, or document unique identifier, for the comment, along with a user name of a comment owner, in other words, a user who created the comment ("Vernon").

The comment group 324 indicates that three users have access to the comment 320: Vernon, Betty, and Carrie. Additionally, a permissions indicator 325 (an icon of a padlock) indicates that permissions have been applied to the comment 320. In some examples, the permissions indicator 325 is omitted when comment permissions have not been applied to the comment 320 (i.e., when access to the comment is not restricted, or not restricted differently from access to the document itself). In still other examples, the permissions indicator 325 has different appearances that correspond to a particular access type for a current user of the user interface 300. For example, the permissions indicator 325 may be displayed as an icon of eyeglasses for a read only access type, as an icon of a pencil for a write only access type, or other suitable icons and access types.

The comment 320 corresponds to anchor 326, which is shown as underlining applied to the words "White zone" along with a connecting line that connects the underlining to the comment 320. The anchor 326 may be represented within the user interface 300 different from a stored value corresponding to the anchor. For example, a stored value for the anchor 326 may be a globally unique identifier for a portion of the document content 312. In one example, when a comment is created, a control character (not shown) or other suitable data structure is inserted into the document 310. The control character may include metadata corresponding to a start and end of a content area of the document 310 corresponding to the comment, a manner of displaying or highlighting the content area, etc.

Comments within a document may be a starting point for additional comments or replies according to a hierarchy. For example, a parent comment may have several child comments (i.e., a reply to the parent comment), grandchild comments (i.e., a reply to a child comment), etc. In the example shown in FIG. 3, the comment 320 as a parent comment includes a reply 328 and a reply 329 as child comments. The comment 320 may be referred to as a comment thread, comment hierarchy, or comment sequence, in various examples. Generally, child comments share same permission groups and permissions indicators as their respective parent comments. For example, the child comments 328 and 329 are shown with a same permissions group (Vernon, Betty, Carrie) and permissions indicator 65 (lock icon). This improves readability for users when viewing a comment thread, especially when the comment thread contains many comments, comments with many words, etc. by helping to remind users who have access to the comment thread and what level of access is allowed. In other examples, a user may set an access type for a child comment that is different from a corresponding parent comment.

The comment 340, including comment content 342 and comment group 344, corresponds to an anchor 346. The anchor 346 is shown as a dashed line bounding box around a portion of the document content 312. The comment 340 is also a parent comment, having reply 348 as a child comment.

The comment 360 is an example of a comment displayed without comment content, for example, with a view only access type. In other words, a user can see that the comment 360 exists, but cannot read the corresponding content or replies. The comment 360 includes a comment group 362 (Vernon, Betty), indicating which users have access to the comment 360. This enables a user, such as a document owner of the document 310, to identify the users for follow-up, for example, to close out comments as part of a finalization of the document 310. In other examples, the comment group 362 is omitted, for example, to maintain anonymity of the members of the comment group 362.

Comments may be displayed differently for a document according to a particular user's permissions. In the example shown in FIG. 3, the user interface 300 is shown from a perspective of a user "Carrie". Accordingly, comments 320 and 340, with at least write access for Carrie, are visible along with their replies, while only a placeholder is shown for comment 360 (with view only access).

The comments 320 and 340 of FIG. 3 are shown as comment threads with same levels of access for the comment and replies. In other words, a user with comment permissions for the comment 320 has those same permissions on the replies 328 and 329. In other examples, different levels of access (e.g., access types) may be configured for replies within a comment thread. For example, a target user may be given write access to the comment thread (e.g., able to post replies) but only read access or view access to replies from other users. In the example shown in FIG. 3, for example, Betty may have write access to the comment 320 so that Betty may create the reply 328, but Betty may be unable to view the content of the reply 329 from Carrie. Other variations on different access types provided for comments will be apparent to those skilled in the art.

The client software 105 that provides the user interface 300 may be further configured to provide improved usability and faster access for applying permissions to comments. In some examples, selection of a target user for a permissioned comment is performed with a user interface (not shown) that automatically selects, or suggests, user identifiers for individual users or groups that should be granted access to the permissioned comment. As one example, when a member of an editing group creates a permissioned comment, other members of the editing group may be suggested for the permissioned comment. As another example, when a user creates a permissioned reply to an existing comment, an author of the existing comment may be suggested for the permissioned reply (e.g., to share a private reply).

Figure 4:
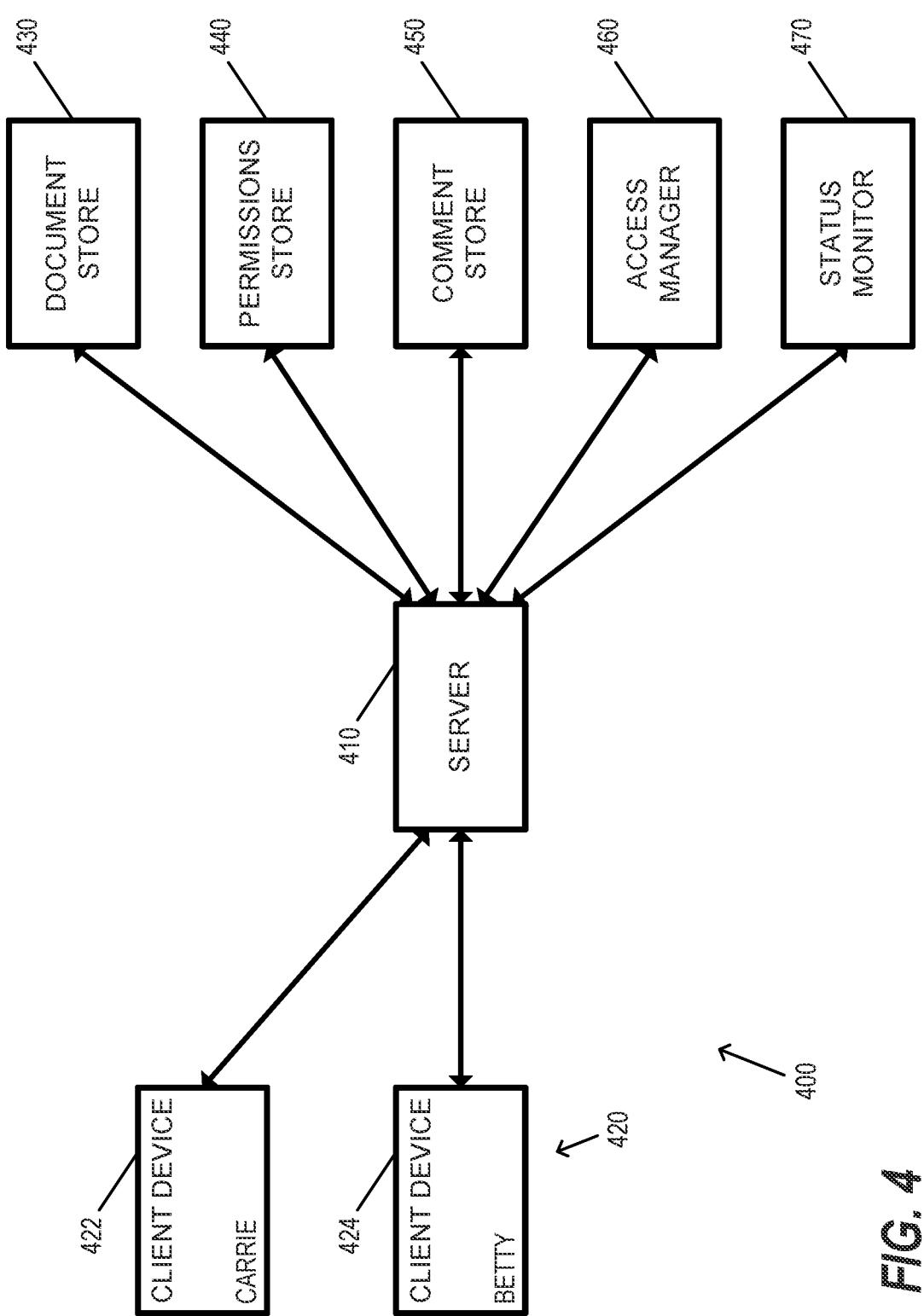
FIG. 4 is a block diagram of an example networking environment for managing comments in electronic documents, according to an embodiment.

FIG. 4 is a block diagram of an example networking environment 400 for managing comments in electronic documents, according to an embodiment. The networking environment 400 comprises a server 410 configured for receiving requests for permissions to be applied to comments, requests for documents and comments, etc. The requests may be received from one or more client devices 420, such as client device 422 and client device 424.

Generally, the server 410 may correspond to the computing device 100 and/or the computing device 106, while the client devices 420 may correspond to the computing devices 104, in various embodiments. The computing devices 420 may provide the client software 105, and thus, instances of the user interface 300, to different users. Generally, documents and comments are displayed according to appropriate permissions, as described herein.

The networking environment 400 comprises one or more additional components for managing comments. For example, the networking environment 400 as shown in FIG. 4 includes a document store 430, a permissions store 440, a comment store 450, an access manager 460, and a status monitor 470. The document store 430, the permissions store 440, and the comment store 450 may be implemented by one or more instances of the media storage device 108, for example, as one or more databases. The document store 430) is configured to store electronic documents, such as the document 310. The document store 430 may also store metadata about the documents. The permissions store 440 is configured to store permissions for comments, such as different levels of access types to be enforced for comments and replies. In some examples, the permissions store 440 also stores permissions for documents that are stored in the document store 430. The comment store 450 is configured to store comments, such as the comments 320, 340, and 360, along with replies (e.g., replies 328, 329, 348). The comment store 450 may also store metadata for the comments and replies.

The access manager 460 is configured to authenticate users, such as the users 120, 122, 124, as they interact with the client software 105. In some examples, the access manager 460 receives credentials from the users (e.g., user passwords) or performs other suitable authentication procedures to authenticate users and/or computing devices. In some examples, the access manager 460) provides a user ID for an authenticated user, which can then be provided to the permissions store 440 to identify suitable access types for the authenticated user. The status monitor 470 is configured to facilitate the sending of updates to users when changes or updates have been made to a comment or comment thread. For example, the status monitor 470) may send a notification to a comment owner of a comment when another user has created a reply to the comment. In some examples, the status monitor 470 creates and manages tracking identifiers that uniquely identify content, comments, portions of documents, or other suitable locations within a document. When a change has been made to content associated with the tracking identifier (e.g., adding a reply to a comment), the status monitor 470 may provide a notification to a user, perform a suitable process responsive to the change (e.g., to update another portion of a document), etc.

In other examples, one or more of the components of FIG. 4 may be combined. For example, the document store 430 and the comment store 450 may be combined as a single data store. As another example, the permissions store 440 and the access manager 460 may be combined as a single authentication and permissions manager. As yet another example, the permissions store 440) and the comment store 450 may be combined as a single data store. Other variations of combinations will be apparent to those skilled in the art.

Figure 5:
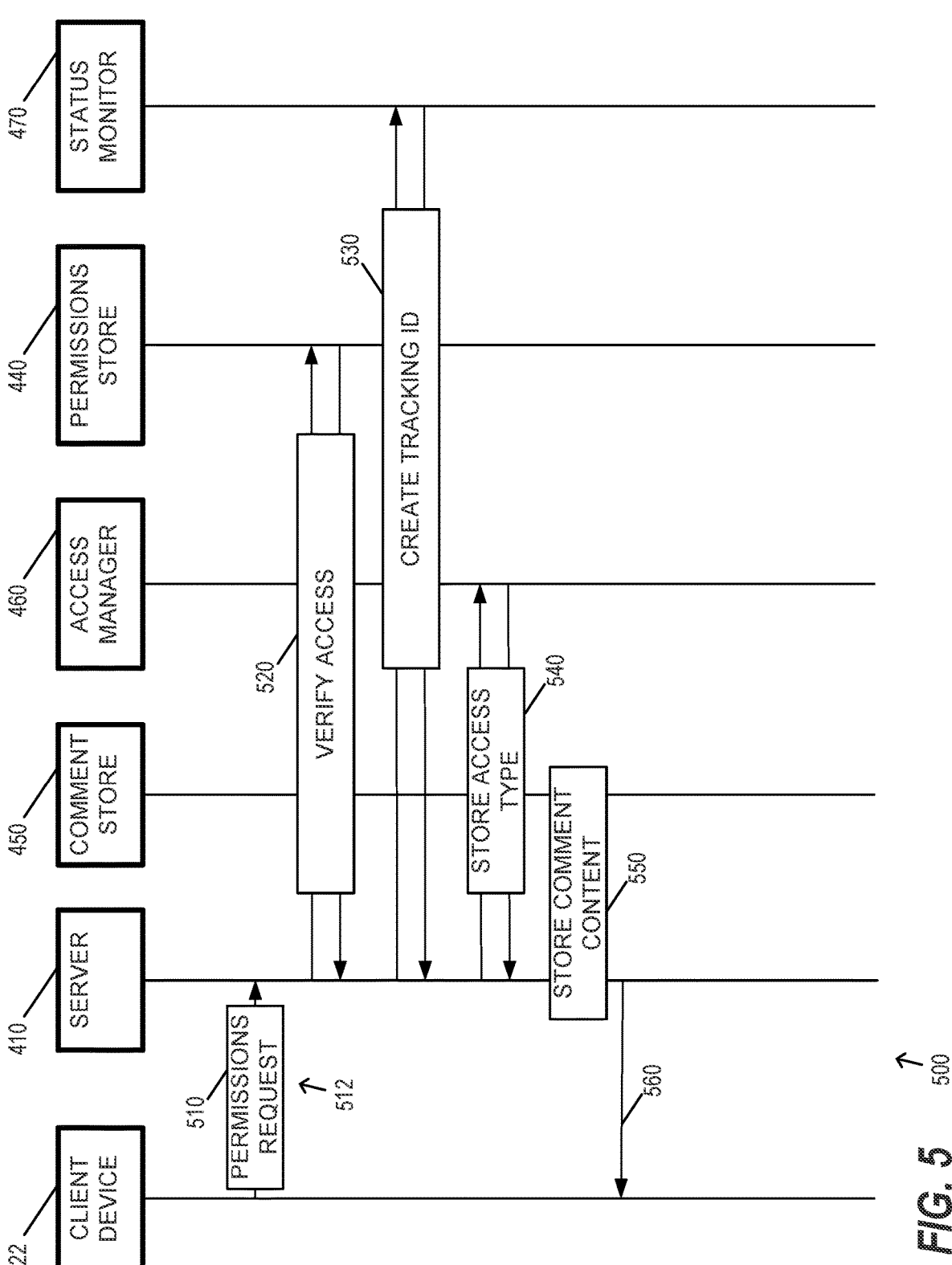
FIG. 5 is a flow diagram of an example process for adding a new comment, according to an embodiment.

FIG. 5 is a flow diagram of an example process 500 for adding a new comment, according to an embodiment. Aspects of the process 500 may be performed by examples of the devices from FIG. 4, as shown in FIG. 5. In some examples, steps of the process 500 may be omitted or additional steps may be added. Variations of the process 500 may be performed for adding permissions to an existing comment, changing permissions to an existing comment, removing permissions for an existing comment, etc.

At step 510, the server 410 receives a permissions request 512 from the client device 422 (i.e., a request for comment permissions to be applied). The permissions request 512 may be any suitable request related to comment permissions, such as a request to add a new comment with permissions, a request to add or change permissions to a pre-existing comment, etc. In the example of FIG. 5, the permissions request 512 corresponds to a request to add the comment 340 to the document 310. As an example, a requesting user, Carrie, may interact with client software 105 running on the client device 422 to create the comment 340). The client device 422, based on the interaction by Carrie, may create one or more requests with suitable data (e.g., parameters for setting an access type). For example, the requests may include a user identifier for Carrie, content of the comment to be added (i.e., "Can we update this text sample to a different quote?"), a user identifier for allowed users or groups who are to be allowed access to the comment to be added (i.e., an identifier for members of the Quote Team), an access type for the allowed users, etc. In some examples, the permissions request 512 includes multiple instances of user identifiers and corresponding access types.

At step 520, the server 410 verifies access of the requesting user to perform the requested action. In the present example, the requested action is a request to add a new comment (comment 340) with permissions to the document 310. The server 410 exchanges data with the permissions store 440 to determine whether the requesting user has been granted permission to create comments within the document 310. In some examples, the server 410 determines whether the requesting user has permissions to create comments generally, in addition to determining whether the requesting user has permissions to create comments within the document 310. To verify access, the server 410 may send the user identifier for the requesting user, a document identifier for the document 310, and other suitable data to the permissions store 440. The permissions store 440 may then respond with an indication of whether the requesting user has permissions to create the comment. When the requesting user does not have permission, the server 410 may provide a suitable response (not shown) to the client device 422 via the client software 105, such as an error message "You do not have permission to create a comment here."

At step 530, when the requesting user has permission to create the comment, the server 410 obtains a tracking identifier that will represent the comment 340. For example, the tracking identifier may refer to a data structure that stores the comment 340 and provide a reference for notifications when subsequent changes or updates are made to the comment 340. In some examples, the status monitor 470 creates and manages tracking identifiers for documents and comments. In other examples, the tracking identifier is created by the comment store 450 as a unique key within a database of the comment store 450.

At step 540, the server 410 stores one or more access types for the comment 340. The access types may be stored with the tracking identifier so that subsequent attempts to access the comment may be checked against the access types. Some examples of access types include:

No access: a user cannot see that a comment exists;

View access: a user can see that a comment exists, but not its content;

Read access: a user can see a comment and read its content;

Write access: a user can see or add a comment, read its content, and add a reply;

Permissions access: a user can change permissions for the comment;

Delete access: a user can remove the comment and its replies;

Resolve access: a user can mark a comment as resolved.

Other access types will be apparent to those skilled in the art. Note that "No access" or "View access" may result in hidden threads of comments for a user. In some examples, multiple access types may apply for a single user, such as having Read access, Write access, and Resolve access, but not Delete access. In some examples, the access types may correspond to different roles for a user with respect to a document or within an organization, such as an author role, a reviewer role, etc. In one such example, a reviewer role may have read, write, and resolve access, while only an author role has delete access for a given comment. Since the comment permissions for the permissions request 512 allow for or grant an access type by the allowed users, conversely, the permissions for the permissions request 512 restrict the access type for target users that are not within the set of allowed users (e.g., an implicit exclusion). In other embodiments, the access type may be stored with the comment content, described below:

At step 550, the server 410 stores the content of the comment along with the tracking identifier within the comment store 450. The server 410 may then provide a confirmation 560 of the creation of the comment 340 to the client device 422.

Figure 6:
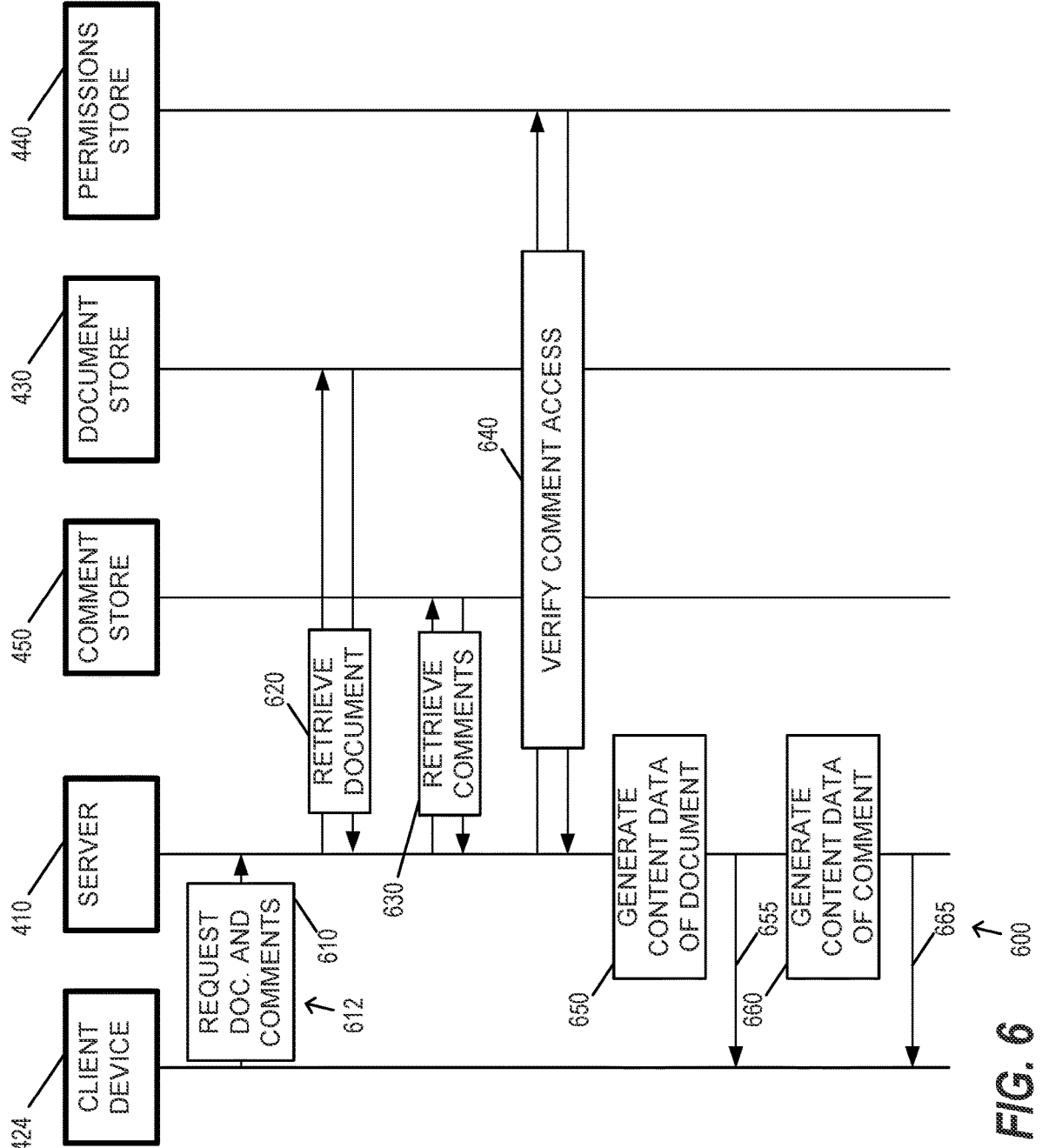
FIG. 6 is a flow diagram of an example process for opening a document with comments, according to an embodiment.

FIG. 6 is a flow diagram of an example process for opening a document with comments, according to an embodiment. The document may correspond to the document 310 with comments 320, 340, and 360, for example.

At step 610, the server 410 receives a request 612 for the document 310 from the client device 424. In one example, a requesting user interacts with the client software 105 on the client device 424 to open the document 310. In some examples, the request 612 includes an explicit request for comments within the document 310. In other examples, the request 612 is an implicit request for the comments within the document 310. The request 612 includes a user identifier for the requesting user, specifically, a user of the client device 424 who requests the document 310.

At step 620, the server 410 retrieves data for the document 310 from the document store 430. For example, the server 410 receives document content for the document 310 and may also receive metadata that facilitates display of the document 310 on the client software 105. In some examples, the document content or metadata includes one or more tracking identifiers for comments within the document 310. In some examples, the server 410 authenticates (not shown) the requesting user (e.g., using the access manager 460) before receiving the data for the document 310.

At step 630, the server 410 retrieves suitable data for the comments within the document 310. For example, the server 410 may send a message with tracking identifiers for the comments within the document 310 and receive comment content, along with comment metadata that facilitates display of the comments. In some examples, the comment content received may include comment content for which the requesting user does not have access. To restrict access, a follow-up step for verification is performed before providing the comment content to the client device 424.

At step 640, the server 410 verifies comment access for the requesting user. For example, the server 410 determines which comments the requesting user is allowed to access. In some examples, the server 410 provides the user identifier of the requesting user and the tracking identifiers to the permissions store 440. The permissions store 440 then provides corresponding access types for the requesting user.

At step 650, the server 410 generates content data of the document 310 based on the data retrieved from the document store 430. In some examples, the server 410 generates one or more scripts, text, code, data structures, binary objects, images, or other suitable data for processing by the client device 424. In other examples, the server 410 directly provides content data received from the document store 430. The content data for the document is provided (step 655) to the client device 424, for example, for display on the user interface 300. Notably, the content data may, in some examples, be distinct from a rendered representation of the user interface 300.

At step 660, the server 410 generates content data of the comments for the document 310. For example, the server 410 may generate one or more scripts, text, code, data structures, binary objects, images, or other suitable data for processing by the client device 424. More specifically, the server 410) generates content data for the comments that the requesting user is allowed to access, based on the access types received from the permissions store 440. In other words, the server 410 omits content data for comments for which the requesting user does not have an appropriate access type. Notably, the content data for the comments may, in some examples, be distinct from a rendered representation of the user interface 300.

At step 665, the content data of the comments are provided to the client device 424 for display by the client software 105. Based on the content data for the document (step 655) and the content data for the comments (step 665), the client software 105 may generate the user interface 300, for example. In some examples, the content data for the document generated in step 650 and the content data for the comments generated in step 660 are generated concurrently and provided to the client device 424 as a single data structure, binary object, or other suitable format.

Although the steps shown in FIG. 6 illustrate specific interactions among the client device 424, the server 410, the comment store 450, the document store 430, and the permissions store 440, these interactions may be implemented using any number of suitable application programming interfaces, communication protocols, data security or encryption routines, or other suitable processes. In some examples, the retrieval of data is performed in multiple steps, for example, with separate requests (e.g., API calls) for different portions of the document 310 and/or the comments within the document 310.

FIG. 7 is a diagram of an example user interface 700 for displaying a comment summary, according to an embodiment. The user interface 700 may be provided by the computing device of FIG. 2, one or more of the computing devices 104, or other suitable devices, in various examples. In the embodiment shown in FIG. 7, the user interface 700 may correspond to the client software 105 and display a summary card 710, having a summary of comments within a given document.

Since some comments may not be visible to a requesting user, even to a document's author, the summary card 710 provides information about the comments within a document, even those comments that may be hidden from the requesting user. For example, a document author may want to check for the existence of comments or threads that are private or hidden from them before finalizing a document for publication. Accordingly, the summary card 710 allows the user to view a summary, or other suitable information, about comments within the document.

The summary card 710 generally indicates data and/or metadata related to comments and/or replies within a document, such as the document 310. In the example shown in FIG. 7, the summary card 710 indicates a total number of comments within the document 310 (20 total comments), including both visible and hidden comments, and also a total number of comment threads (3 comment threads). The summary card 710 further indicates a current status of the comment threads, such as an open thread where replies are still allowed, a resolved (or closed) thread where no further replies are allowed, and a hidden thread where limited information is provided. Generally, the summary card 710 includes only data for which the requesting user has permission. For example, the user Carrie in the example of FIG. 3 has write access to the comment 320, write access to the comment 340, and view access to the comment 360. Accordingly, the server 410 generally does not provide data that would reveal information about the comment 360 which the requesting user would not already be allowed to obtain.

FIG. 8 is a flowchart illustrating an example method 800, implemented on a server, for restricting comment access for a document, according to an embodiment. In some examples, the method 800 is implemented by the productivity server 100 of FIG. 1, which interacts with the database server 106 and the client devices 104. In other examples, the method 800 is implemented by the server 410.

At step 802, a request for comment permissions to be applied to a comment within the document is received. The comment permissions exclude a target user from an access type for the comment. In some examples, the comment permissions exclude a target group of users from the access type for the comment (e.g., where the target group includes the target user). Generally, the request may correspond to the permissions request 512 (FIG. 5) or the request 612 (FIG. 6). In other examples, the comment permissions identify one or more target users to be granted the access type for the comment.

At step 804, the comment permissions are applied to the comment. The comment permissions are distinct from document permissions for the document. In other words, the comment permissions may be more or less restrictive than the document permissions for the document. In some examples, applying the comments includes verifying that the request is from an owner of the comment.

At step 806, content data of the document is generated, for display on a user interface for the target user, according to the document permissions. The content data of the document may generally correspond to the content data generated in step 650 (FIG. 6).

At step 808, content data of the comment is generated, for display on the user interface for the target user, according to the comment permissions. Step 808 may include restricting the target user from the access type for the comment. In other examples, step 808 may include granting the target user the access type for the comment. The content data of the comment may generally correspond to the content data generated in step 660 (FIG. 6).

As described above, different access types may be provided for different users. In one example, the access type is a view access type and step 808 comprises preventing viewing of the content of the comment by the target user. In another example, the access type is a read access type and step 808 comprises generating the content data to include a comment placeholder for the comment that omits the content of the comment. In yet another example, the access type is a write access type and step 808 comprises generating the content data of the comment to display the content of the comment and restrict modifications to the comment by the target user.

In some examples, the method 800 further comprises retrieving the content of the document from a document store and retrieving the content of the comment from a comment store that is separate from the document store. For example, the document store may correspond to the document store 430 and the comment store may correspond to the comment store 450). In various examples, one or both of the document store 430) and the comment store 450) are implemented as a cloud storage system. Retrieving content of the comment may include retrieving metadata for the comment that includes a location identifier for a location within the content of the document where the comment is to be indicated. The location identifier may correspond to the tracking identifier described above, for example.

The method 800 may further include receiving, from another user, a request for a comment reply to be added to the comment within the document. The comment permissions may be retrieved from a permissions store that is separate from the comment store and the comment reply may be added to the comment when the comment permissions allow replies from the other user. The permissions store may correspond to the permissions store 440, for example.

The method 800 may further comprise generating, for an owner of the document, a comment notification that includes a summary of metadata for comments within the document and excludes content for the comments within the document. For example, the comment notification may correspond to the summary card 710.

FIG. 9 is a flowchart illustrating an example method 900, implemented on a server, for restricting comment access for a document, according to an embodiment. In some examples, the method 900 is implemented by the productivity server 100 of FIG. 1, which interacts with the database server 106 and the client devices 104. In other examples, the method 900 is implemented by the server 410.

At step 902, a request for comment permissions to be applied to a comment within the document is received. The comment permissions identify a plurality of target users to be granted access for the comment. In some examples, the comment permissions grant the plurality of target users a write access type for the comment. In other examples, the comment permissions grant the plurality of target users a delete access type for the comment, or other suitable access types as described above.

At step 904, the comment permissions are applied to the comment. In some examples, the comment permissions are distinct from document permissions for the document. For example, comment permissions may be more or less restrictive than the document permissions.

At step 906, content data of the document is generated for display on a user interface by a document user according to the document permissions. For example, the document 310 may be generated for display as shown in FIG. 3.

At step 908, content data of the comment is generated for display on the user interface, according to the comment permissions. The content data of the comment is excluded from the user interface when the document user has not been granted access by the comment permissions. For example, the comments 320, 340, and 360 may be generated for display as shown in FIG. 3. As shown in FIG. 3, the content data of the comment 360 is excluded from the user interface.

In some examples, the request for comment permissions comprises an inclusion list that identifies the plurality of target users and respective access types granted to the plurality of target users. In other words, the request indicates which users are granted certain access types.

In some examples, the method 900 further includes generating the content data of the document to include a summary card for the comment that omits the content of the comment. The summary card may correspond to the summary card 710, for example.

In some examples, the method 900 further includes verifying that the document user is a document owner before generating the content data of the document to include the summary card. In other words, the summary card is shown only to a document owner, in some examples.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVAR, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for restricting comment access for a document, the method carried out by one or more computing devices and comprising:

receiving a request for comment permissions to be applied to a comment within the document, wherein the comment permissions include a target user to an access type for the comment;

applying the comment permissions to the comment, wherein the comment permissions are distinct from document permissions for the document, and wherein applying the comment permissions to the comment comprises verifying that the request is from a user with permission to access the comment, verifying that the request is from an owner of the comment, and verifying that the owner of the comment has permission to create any comments and to create comments within the document;

generating content data of the document, for display on a user interface for the target user, according to the document permissions;

generating content data of the comment, for display on the user interface for the target user, according to the comment permissions, including restricting the target user from the access type for the comment; and generating the content data of the document to include a summary card for the comment that omits the content of the comment and includes data about the comment for which the target user has permission according to the comment permissions, wherein the access type is a resolve access type, generating the content data of the comment according to the comment permissions comprises allowing the comment to be marked as resolved by the target user and preventing further comments to the comment, and the summary card further indicates a current status of the comment including at least one of whether the comment is an open thread where replies are still allowed, a resolved thread where no further replies are allowed, and a hidden thread where limited information is provided.

2. The method of claim 1, wherein:

the access type is a view access type; and generating the content data of the comment according to the comment permissions comprises allowing viewing of the content of the comment by the target user.

3. The method of claim 1, wherein:

the access type is a write access type; and generating the content data of the comment according to the comment permissions comprises:

generating the content data of the comment to display the content of the comment and allow modifications to the comment by the target user.

4. The method of claim 1, wherein the comment permissions include a target group of users from the access type for the comment.

5. The method of claim 1, the method further comprising:

retrieving the content of the document from a document store, wherein the document is a text-based document, presentation document, or spreadsheet document; and retrieving the content of the comment from a comment store that is separate from the document store.

6. The method of claim 5, wherein retrieving the content of the comment from the comment store comprises retrieving metadata for the comment that includes a location identifier for a location within the content of the document where the comment is to be indicated.

7. The method of claim 5, the method further comprising:

receiving, from another user, a request for a comment reply to be added to the comment within the document;

retrieving the comment permissions from a permissions store that is separate from the comment store; and adding the comment reply to the comment when the comment permissions allow replies from the other user when the comment is not marked as resolved by the target user.

8. The method of claim 1, the method further comprising:

generating, for an owner of the document, a comment notification that includes a summary of metadata for comments within the document and excludes content for the comments within the document.

9. A computing device that restricts comment access for a document, the computing device comprising a processor and a non-transitory computer-readable memory, wherein the processor is configured to carry out instructions from the memory that configure the computing device to:

receive a request for comment permissions to be applied to a comment within the document, wherein the comment permissions include a target user to an access type for the comment;

apply the comment permissions to the comment, wherein the comment permissions are distinct from document permissions for the document, and wherein applying the comment permissions to the comment comprises verifying that the request is from a user with permission to access the comment, verifying that the request is from an owner of the comment, and verifying that the owner of the comment has permission to create any comments and to create comments within the document;

generate content data of the document, for display on a user interface for the target user, according to the document permissions;

generate content data of the comment, for display on the user interface for the target user, according to the comment permissions, including restricting the target user from the access type for the comment; and generate the content data of the document to include a summary card for the comment that omits the content of the comment and includes data about the comment for which the target user has permission according to the comment permissions, wherein the access type is a resolve access type, generating the content data of the comment according to the comment permissions comprises allowing the comment to be marked as resolved by the target user and preventing further comments to the comment, and the summary card further indicates a current status of the comment including at least one of whether the comment is an open thread where replies are still allowed, a resolved thread where no further replies are allowed, and a hidden thread where limited information is provided.

10. The computing device of claim 9, wherein:

the access type is a view access type; and the processor is configured to carry out instructions from the memory that configure the computing device to:

generate the content data of the comment according to the comment permissions to allow viewing of the content of the comment by the target user.

11. The computing device of claim 9, wherein:

the access type is a write access type; and wherein the processor is configured to carry out instructions from the memory that configure the computing device to:

generate the content data of the comment to display the content of the comment and allow modifications to the comment by the target user.

12. The computing device of claim 9, wherein the comment permissions include a target group of users from the access type for the comment.

13. The computing device of claim 9, wherein the processor is configured to carry out instructions from the memory that configure the computing device to:

retrieve the content of the document from a document store; and retrieve the content of the comment from a comment store that is separate from the document store.

14. The computing device of claim 13, wherein the processor is configured to carry out instructions from the memory that configure the computing device to:

retrieve metadata for the comment that includes a location identifier for a location within the content of the document where the comment is to be indicated.

15. The computing device of claim 13, wherein the processor is configured to carry out instructions from the memory that configure the computing device to:

receive, from another user, a request for a comment reply to be added to the comment within the document;

retrieve the comment permissions from a permissions store that is separate from the comment store; and add the comment reply to the comment when the comment permissions allow replies from the other user when the comment is not marked as resolved by the target user.

16. The computing device of claim 9, wherein the processor is configured to carry out instructions from the memory that configure the computing device to:

generate, for an owner of the document, a comment notification that includes a summary of metadata for comments within the document and excludes content for the comments within the document.

17. A method for comment access for a document, the method carried out by one or more computing devices and comprising:

receiving a request for comment permissions to be applied to a comment within the document, wherein the comment permissions identify a plurality of target users to be granted access for the comment and the comment permissions include the plurality of target users to an access type for the comment;

applying the comment permissions to the comment, wherein the comment permissions are distinct from document permissions for the document, and wherein applying the comment permissions to the comment comprises verifying that the request is from a user with permission to access the comment, verifying that the request is from an owner of the comment, and verifying that the owner of the comment has permission to create any comments and to create comments within the document;

generating content data of the document, for display on a user interface by a document user according to the document permissions;

generating content data of the comment, for display on the user interface, according to the comment permissions, wherein the content data of the comment is excluded from the user interface when the document user has not been granted access by the comment permissions; and generating the content data of the document to include a summary card for the comment that omits the content of the comment and includes data about the comment for which the document user has permission according to the comment permissions, wherein the access type is a resolve access type, generating the content data of the comment according to the comment permissions comprises allowing the comment to be marked as resolved by a target user of the plurality of target users and preventing further comments to the comment, and the summary card further indicates a current status of the comment including at least one of whether the comment is an open thread where replies are still allowed, a resolved thread where no further replies are allowed, and a hidden thread where limited information is provided.

18. The method of claim 17, wherein the request for comment permissions comprises an inclusion list that identifies the plurality of target users and respective access types granted to the plurality of target users.

19. The method of claim 17, further comprising:

verifying that the document user is a document owner before generating the content data of the document to include the summary card.

20. The method of claim 17, wherein the comment permissions grant the plurality of target users a write access type for the comment.

21. The method of claim 17, wherein the comment permissions grant the plurality of target users a delete access type for the comment.

* * * * *